United States Patent
Berends et al.

(10) Patent No.: US 10,572,947 B1
(45) Date of Patent: Feb. 25, 2020

(54) ADAPTABLE PROPERTY INSPECTION MODEL

(71) Applicant: Allstate Insurance Company, Northbrook, IL (US)

(72) Inventors: James M. Berends, Buffalo Grove, IL (US); David MacInnis, Lake Forest, IL (US); Cassie E. Collins, Park Ridge, IL (US); Teresa J. Dalenta, Deerfield, IL (US)

(73) Assignee: Allstate Insurance Company, Northbrook, IL (US)

( * ) Notice: Subject to any disclaimer, the term of this patent is extended or adjusted under 35 U.S.C. 154(b) by 524 days.

(21) Appl. No.: 14/956,580

(22) Filed: Dec. 2, 2015

Related U.S. Application Data

(63) Continuation-in-part of application No. 14/478,815, filed on Sep. 5, 2014.

(51) Int. Cl.
  *G06Q 40/00* (2012.01)
  *G06Q 40/08* (2012.01)
  *G06Q 50/16* (2012.01)

(52) U.S. Cl.
  CPC .......... *G06Q 40/08* (2013.01); *G06Q 50/163* (2013.01)

(58) Field of Classification Search
  CPC combination set(s) only.
  See application file for complete search history.

(56) References Cited

U.S. PATENT DOCUMENTS 5,377,306 A  12/1994  Broomhead et al.
6,714,918 B2 *  3/2004  Hillmer ................ G06Q 20/206
                                                  705/18

(Continued)

OTHER PUBLICATIONS

Agrelius (Rethinking the Reinspection Workflow: Slight adjustments can make the process more efficient and more effective, http://clmmag.theclm.org/home/article/rethinking-the-re-inspection-workflow Nov. 24, 2010) (Year: 2010).*

(Continued)

*Primary Examiner* — Bruce I Ebersman
*Assistant Examiner* — Mark H Gaw
(74) *Attorney, Agent, or Firm* — Banner & Witcoff, Ltd.

(57) ABSTRACT

Computer executable instructions may be used to configure a special purpose computing device to perform a method for determining whether an unbound property insurance lead may be associated with a property for which a property inspection is not required. The computer executable instructions, when executed by a processor may cause the special purpose computing device to access a data repository storing a plurality of unbound property insurance leads, process each of the plurality of unbound property insurance leads using an adaptable inspection model to determine an insurability risk score for each of the unbound property insurance leads, compare each insurability risk score to a constraint, and communicate an indication of whether a property inspection is necessary for each of the plurality of unbound property insurance leads.

16 Claims, 8 Drawing Sheets

(56) References Cited

U.S. PATENT DOCUMENTS

| | | | |
|---|---|---|---|
| 7,844,477 B2 | 11/2010 | Bonissone et al. | |
| 8,255,347 B2 | 8/2012 | Ellingsworth | |
| 8,271,308 B2 | 9/2012 | Winkler | |
| 8,428,978 B1 | 4/2013 | Smith | |
| 8,433,650 B1 | 4/2013 | Thomas | |
| 2002/0049624 A1 | 4/2002 | Raveis | |
| 2003/0120519 A1 | 6/2003 | Candos | |
| 2003/0208385 A1* | 11/2003 | Zander | G06Q 40/08 705/4 |
| 2004/0019517 A1* | 1/2004 | Sennott | G06Q 10/10 705/313 |
| 2006/0061586 A1* | 3/2006 | Brulle-Drews | A61B 3/066 345/594 |
| 2007/0185743 A1* | 8/2007 | Jinks | G06Q 40/08 705/4 |
| 2008/0057918 A1 | 3/2008 | Abrant et al. | |
| 2008/0114655 A1 | 5/2008 | Skidmore | |
| 2009/0006136 A1* | 1/2009 | Shapiro | G06Q 40/08 705/4 |
| 2009/0112634 A1 | 4/2009 | Koziol | |
| 2009/0265193 A1* | 10/2009 | Collins | G06Q 30/0185 705/4 |
| 2010/0042442 A1 | 2/2010 | Seitomer et al. | |
| 2010/0070309 A1 | 3/2010 | Deede et al. | |
| 2010/0241556 A1 | 9/2010 | Reinheimer et al. | |
| 2011/0161116 A1* | 6/2011 | Peak | G06Q 40/08 705/4 |
| 2011/0247363 A1 | 10/2011 | Dalstra | |
| 2012/0165618 A1 | 6/2012 | Algoo et al. | |
| 2012/0290333 A1 | 11/2012 | Birchall | |
| 2013/0103430 A1 | 4/2013 | Gore et al. | |
| 2013/0166327 A1 | 6/2013 | Schmidt et al. | |

OTHER PUBLICATIONS

Millennium Information Services, Property PredictR, http://www.predictr.com/propertypredictr.asp, A Smart Approach to Better Pricing and Underwriting Decisions, © 2013 Millennium Information Services, Inc., 2 pages, Jul. 31, 2013.

FICO, Millennium Information Services, Inc., Property PredictR™-a FICO® Insurance Score from Millennium Information Services, www.fico.com, © 2005-2009 Fair Isaac Corporation, 2 pages, Jul. 31, 2013.

FEMA, Disaster Assistance Frequently Asked Questions, http://www.fema.gov/disaster-assistance-frequently-asked-questions#qd_13, 22 pages, Jul. 31, 2013.

InsuranceQnA.com, What do insurance company's house inspections involve?, http://www.insuranceqna.com/home-insurance/insurance-company-house, © 2009-2013 InsuranceQnA.com, 2 pages Jul. 31, 2013.

Oct. 3, 2017—U.S. Non-Final Office Action—U.S. Appl. No. 14/478,815.

Dec. 21, 2016—U.S. Non-Final Office Action—U.S. Appl. No. 14/478,815.

Jun. 7, 2017—U.S. Final Office Action—U.S. Appl. No. 14/478,815.

Apr. 11, 2018—U.S. Final Office Action—U.S. Appl. No. 14/478,815.

Oct. 29, 2018—U.S. Non-Final Office Action—U.S. Appl. No. 14/478,815.

Robert Schapire, "What is Machine Learning?", COS 511: Theoretical Machine Learning, Lecture #1, Feb. 4, 2008.

"What is Machine Learning" Definition downloaded from <https://www.techopedia.com/definition/8181/machine-learning> on Nov. 23, 201t.

"Algorithm" Definition downloaded from <https://whatis.techtarget.com/definition/algorithm> on Aug. 17, 2014.

Mar. 11, 2019—U.S. Final Office Action—U.S. Appl. No. 14/478,815.

* cited by examiner

ADAPTABLE PROPERTY INSPECTION MODEL

This application is a continuation-in-part of, and claims priority to, co-pending U.S. application Ser. No. 14/478,815, filed Sep. 5, 2014, which is incorporated herein by reference in its entirety.

BACKGROUND

Many people seeking insurance coverage for a property (e.g., homeowner insurance, commercial property insurance, etc.), may request an insurance quotation from an insurance agent and/or insurance agency. An underwriting tool used by the insurance provider may cause an offered insurance policy to be conditional on a result of an inspection of the property. The underwriting tool may determine that a property is to be inspected based on a number of factors including the age of the property, the size of the property, the location of the property, and the like. If certain rules are triggered, an inspection may not be ordered. When a large percentage of the properties are flagged for inspection, the costs associated with providing property insurance coverage are increased. An insurance provider may have a policy in place to inspect every property for which insurance coverage is provided.

In some cases, the insurance policy may be canceled, without consequence to the insurance provider, based on the results of the inspection. An illustrative insurance policy may specify a "cancellation window" (e.g., about 60 days) in which the policy may be canceled subject to results of a property inspection, where this cancellation window may include a time necessary to schedule a third party vendor to inspect the condition and/or attributes of the property according to standard industry practices and to provide a report to the insurance provider. Upon reviewing the inspection results, the insurance provider may then decide to cancel the property insurance policy. Such cancellations, while necessary to minimize risks associated with insuring properties, are unfriendly to the customer.

Therefore, a need exists for a customer-friendly method and system for identifying which properties are to be inspected, while minimizing the associated costs.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to systems, device, computer-implemented methods, and computer-readable media for determining whether to order an inspection of a property. For example, a computer implemented method may include receiving a request for insurance coverage of a property and determining, by one or more computing devices, an insurability risk score for the property using an adaptable inspection model. The adaptable inspection model may be configured to analyze one or more risks associated with providing insurance coverage for the property. The computing device may further compare the insurability risk score to a constraint and order an inspection of the property if the insurability risk score meets the constraint.

In accordance with additional aspects of the disclosure, various devices and systems may be used to implement a method for providing real-time information corresponding to whether an insurance quotation is subject to a property inspection. The method may include receiving a request for property insurance for each of a plurality of properties and evaluating, by a computing device, a first insurability risk associated with each of the plurality of properties using a first model. The computer device may evaluate a second insurability risk associated with each of the plurality of properties using a second model, determine whether to inspect each of the plurality of properties based on a weighted combination of the first insurability risk and the second insurability risk, and provide to an originator of the request, a real-time indication of whether or not a property is to be inspected.

In accordance with additional aspects of the disclosure, various devices and systems may be used to implement a system comprising a user interface and a computer device comprising a processor and a non-transitory memory device. The non-transitory memory device may store instructions that, when executed by the processor, cause the computer device to receive, via the user interface, a request to provide insurance coverage for a property and determine an insurability risk score corresponding with a risk of providing insurance coverage for the property using an adaptable inspection model. The adaptable inspection model may include a first model, a second model, and a control model, wherein the insurability risk score is computed using a weighted output of the first model and a weighted output of the second model. The instructions may further cause the computer device to order an inspection of the property when the control model randomly selects the property for inspection or when the insurability risk score meets a constraint and to report, via the user interface, whether or not the property is to be inspected.

In accordance to aspects of this disclosure, a system for identifying a plurality of property insurance leads based on historical or stored information may include a data repository in communication via a network to a property inspection computing device. The property inspection computing device may include a processor and a non-transitory memory device storing instructions that, when executed by the processor, may cause the property inspection computing device to access, at the data repository via the network, a plurality of property insurance leads. The property insurance leads may be insurance leads provided by a third-party organization, may be associated with a plurality of previously unbound leads and/or may be based on information associated with a plurality of insurance policies that have already been issued by an insurance provider. The computer executable instructions may further cause the property inspection computing device to determine an insurability risk score for a property associated with each of the property insurance leads using an adaptable inspection model, the adaptable inspection model for identifying one or more risks associated with providing insurance coverage for the property, compare the insurability risk score to a constraint, determine whether the insurability score meets the constraint, and output an indication whether or not an inspection of each property associated with each of the plurality of insurance leads is to be ordered when the insurability score meets the constraint.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
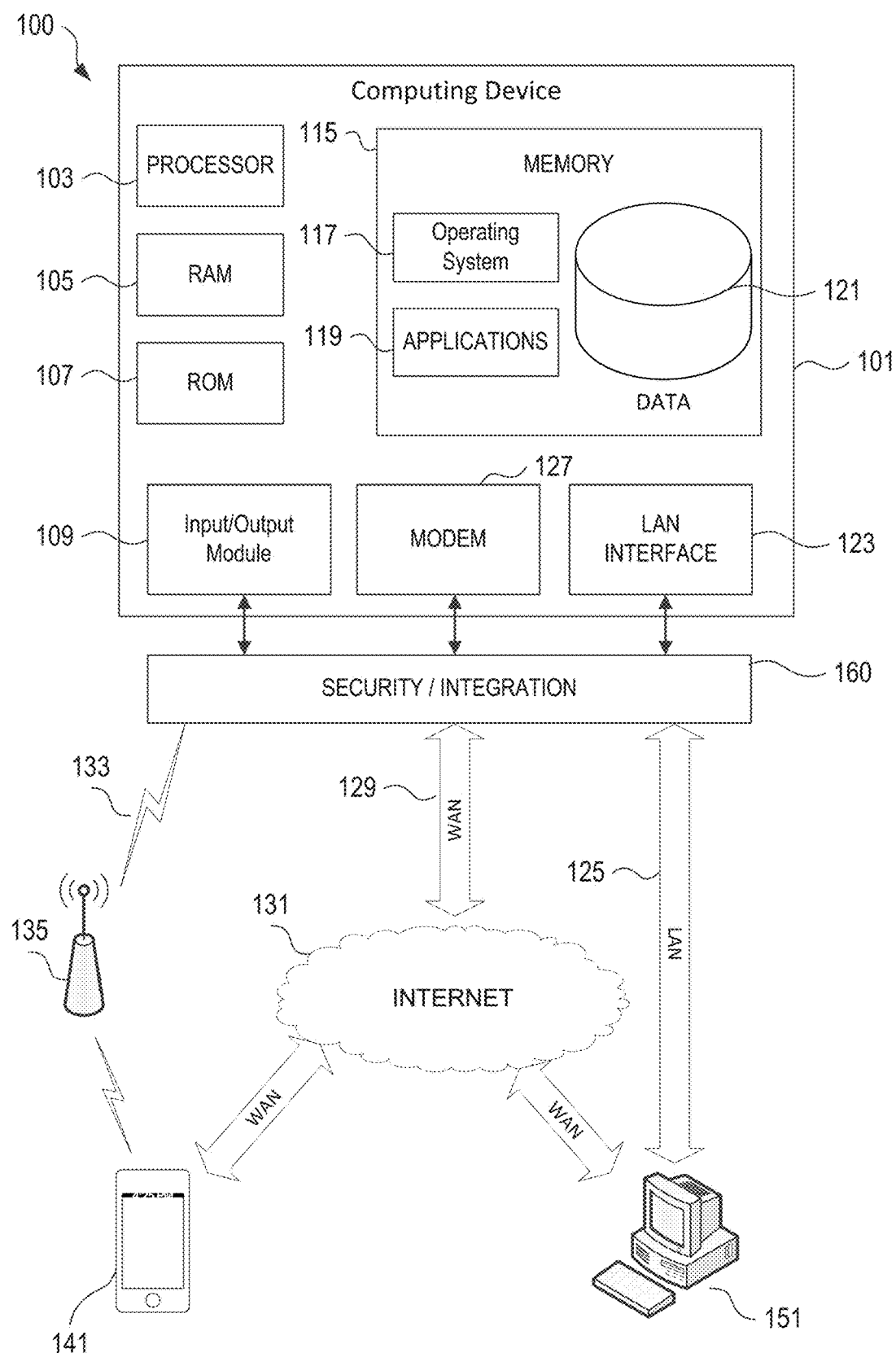
FIG. 1 illustrates a network environment and computer systems that may be used to implement aspects of the property inspection system.

FIG. 1 illustrates a block diagram of a computing device (or system) 101 (e.g., a property inspection decision device) in a computer system 100 (e.g., a property inspection system) that may be used according to one or more illustrative embodiments of the disclosure. The computing device 101 may have a processor 103 for controlling overall operation of the computing device 101 and its associated components, including one or more memory units (e.g., RAM 105, ROM 107), an input/output module 109, and a memory 115. The computing device 101, along with one or more additional devices (e.g., terminals 141 and 151, security and integration hardware corresponding to an integration layer 160) may correspond to any of multiple systems or devices, such as a property inspection system and/or a property inspection decision device configured as described herein for determining an insurability risk score using an adaptable inspection model in response to a request to provide insurance coverage for a property, comparing the insurability risk score to a constraint, and/or ordering an inspection of the property when the insurability risk score meets the constraint.

The input/output (I/O) 109 may include one or more user interfaces, such as a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various actions. For example, memory 115 may store software used by the device 101, such as an operating system 117, application programs 119, and an associated database 121 (e.g., an internal database). The various hardware memory units in memory 115 may include volatile and nonvolatile, removable and non-removable media implemented in any method or technology for storage of information such as computer readable instructions, data structures, program modules or other data. The memory 115 also may include one or more physical persistent memory devices and/or one or more non-persistent memory devices. The memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the processor 103.

The processor 103 may include a single central processing unit (CPU), which may be a single-core or multi-core processor (e.g., dual-core, quad-core, etc.), or may include multiple CPUs. In some cases, the processor 103 may have various bit sizes (e.g., 16-bit, 32-bit, 64-bit, 96-bit, 128-bit, etc.) and various processor speeds (ranging from 100 MHz to 5 Ghz or faster). The processor 103 and its associated components may allow the system 101 to execute a series of computer-readable instructions, for example, to determine an insurability risk score using an adaptable inspection model in response to a request to provide insurance coverage for a property. The adaptable inspection model is configured to analyze a risk associated with providing insurance coverage for the property, compare the insurability risk score to a constraint, and order an inspection of the property when the insurability risk score meets the constraint. In some cases, the instructions may be configured to cause the processor 103 to determine a first model risk score that corresponds to an insurability risk associated with insuring the property. The first model risk score may be determined using a first inspection risk model. The instructions may further cause the processor to determine a second model risk score that corresponds to an insurability risk associated with insuring the property. The second model risk score may be determined using a second model. The instructions may further cause the processor to determine the insurability risk score based on the first model risk score and the second model risk score.

The computing device 101 (e.g., a customer terminal, an insurance provider computer hardware memory and processor system, an insurance clearinghouse computer memory and processor device, etc.) may operate in a networked environment (e.g., the computing system 100) supporting connections to one or more remote computers, such as terminals 141 and 151. The terminals 141 and 151 may be personal computers, servers (e.g., web servers, database servers), clients, or mobile communication devices (e.g., mobile phones, portable computing devices, and the like), and may include some or all of the elements described above with respect to the computing device 101. In some cases, the terminals 141, 151 may be located at one or more different geographic locations, including, but not limited to, at a site associated with an insurance agent and/or agency and/or a site associated with an insurance provider. The network connections depicted in FIG. 1 include a local area network (LAN) 125 and a wide area network (WAN) 129, and a wireless telecommunications network 133, but may also include other networks. When used in a LAN networking environment, the computing device 101 may be connected to the LAN 125 through a network interface or adapter 123. When used in a WAN networking environment, the device 101 may include a modem 127 or other means for establishing communications over the WAN 129, such as network 131 (e.g., the Internet, a cellular network, and the like). When used in a wireless telecommunications network 133, the computing device 101 may include one or more transceivers, digital signal processors, and additional circuitry and software for communicating with wireless computing devices 141 (e.g., mobile phones, portable customer computing devices) via one or more network devices 135 (e.g., base transceiver stations) in the wireless telecommunications network 133.

Also illustrated in FIG. 1 is a security and integration layer 160, through which communications may be sent and managed between the computing device 101 and the remote devices (terminals 141 and 151) and remote networks (networks 125, 129, and 133). The security and integration layer 160 may comprise one or more computing devices, such as web servers, authentication servers, and various networking components (e.g., firewalls, routers, gateways, load balancers, etc.), having some or all of the elements described above with respect to the computing device 101. As an example, security and integration layer 160 may comprise a set of web application servers configured to use secure protocols and to insulate the computing device 101 (e.g., one or more servers, a workstation, etc.) from external devices (e.g., terminals 141 and 151). In some cases, the security and integration layer 160 may correspond to a set of dedicated hardware and/or software operating at the same physical location and under the control of same entities as the computing device 101. For example, the integration layer 160 may correspond to one or more dedicated web servers and network hardware in a data center or in a cloud infrastructure supporting a cloud-based application and/or process. In other examples, the security and integration layer 160 may correspond to separate hardware and software components which may be operated at a separate physical location and/or by a separate entity.

In some cases, the data transferred to and from computing device 101 in may include secure and sensitive data, such as insurance customer and policy data. Therefore, it may be desirable to protect the data transmission by using secure network protocols and encryption, and also to protect the integrity of the data stored when on the computing device 101 using the security and integration layer 160 to authenticate users and restrict access to unknown or unauthorized users. In various implementations, security and integration layer 160 may provide, for example, a file-based integration scheme or a service-based integration scheme. In filed-based integration, data files may be transmitted to and from the computing device 101 through the security and integration layer 160, using various network communication protocols. Secure data transmission protocols and/or encryption may be used in file transfers to protect to integrity of the data, for example, File Transfer Protocol (FTP), Secure File Transfer Protocol (SFTP), and/or Pretty Good Privacy (PGP) encryption.

In service-based integration, one or more web services may be implemented within the system 100 between the computing device 101 and/or security and integration layer 160. The web services may be accessed by authorized external devices and users to support input, extraction, and manipulation of the data in the computing device 101. Web services built to support to the system 100 may be cross-domain and/or cross-platform, and may be built for enterprise use. Such web services may be developed in accordance with various web service standards, such as the Web Service Interoperability (WS-I) guidelines. In some examples, system web services may be implemented in the security and integration layer 160 using the Secure Sockets Layer (SSL) or Transport Layer Security (TLS) protocol to provide secure connections between the computing device 101 and various clients (e.g., terminals 141 and 151) attempting to access, insert and/or manipulate data within the system 100. SSL or TLS may use HTTP or HTTPS to provide authentication and/or confidentiality. In some cases, system web services may be implemented using the WS-Security standard, which provides for secure SOAP messages using XML, encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within the memory 115 or other components in the system 100, may include one or more caches, for example, CPU caches used by the processing unit (e.g., the processor 103), page caches used by the operating system 117, disk caches of a hard drive, and/or database caches used to cache content from the database 121. For embodiments including a CPU cache, the CPU cache may be used by one or more processors in the processing unit (e.g., the processor 103) to reduce memory latency and access time. In such examples, a processor 103 may retrieve data from or write data to the CPU cache rather than reading/writing to memory 115, which may improve the speed of these operations. In some examples, a database cache may be created in which certain data from the database 121 may be cached in one or more separate smaller databases on an application server separate from the database server. For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of the system 100.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computer devices and life insurance clearinghouse system components described herein may be configured to communicate using any of these network protocols or technologies.

Additionally, one or more application programs 119, such as a property inspection determination application, may be used by the computing device 101 within the system 100, including computer executable instructions for determining an insurability risk score using an adaptable inspection model in response to a request to provide insurance coverage for a property, the adaptable inspection model configured for analyzing a risk associated with providing insurance coverage for the property, comparing the insurability risk score to a constraint and ordering an inspection of the property when the insurability risk score meets the constraint. In some cases, the instructions may cause the computer device 101 to receive a request to provide insurance coverage for a property, determine an insurability risk score corresponding with a risk of providing insurance coverage for the property using an adaptable inspection model, the adaptable inspection model including a first model, a second model, and a control model, wherein the insurability risk score is computed using a weighted output of the first model and a weighted output of the second model, order an inspection of the property when the control model randomly selects the property for inspection or when the insurability risk score meets a specified constraint, and report, via the user interface, whether or not the property is to be inspected.

Figure 2:
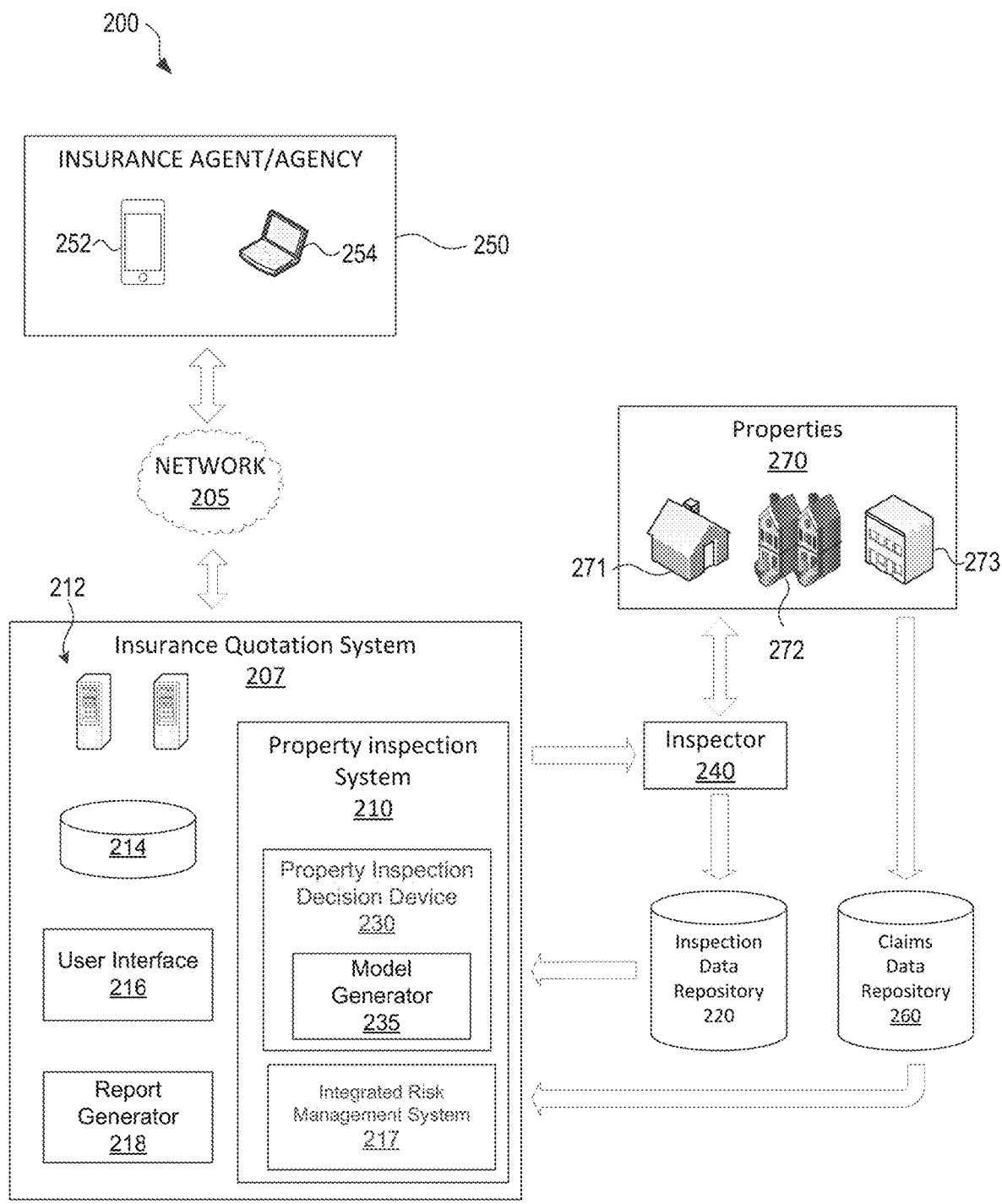
FIG. 2 is a diagram illustrating various components of an illustrative property inspection determination system, according to one or more aspects of the disclosure.

FIG. 2 is a diagram illustrating various components of a property inspection determination system 200, according to one or more aspects of the disclosure. In an example, the property inspection determination system 200 may include an insurance quotation system 207 having a property inspection system 210, where the insurance quotation system 207 may be communicatively coupled to a computer system associated with an insurance agent and/or agency 250 via a network 205 (e.g., the Internet, a telecommunications network, a LAN, a WAN, etc.). The insurance agent and or agency 250 may be associated with an insurance provider associated with the insurance quotation system 207. Further, the insurance quotation system may include one or more computing devices 212, a data repository 214, a user interface 216, a report generator 218 and/or a property inspection system 210.

In some cases, the property inspection system 210 may include a property inspection decision device 230 that may include a model generator 235 and an integrated risk management system 217. In some cases, one or more of the report generator 218, the property inspection decision device 230, and/or the model generator 235 may be implemented using the one or more computing devices 212 that may be executing instructions stored in the data repository 214. The property inspection system 210 may be communicatively coupled to and/or include one or more data repositories storing historical information associated with one or more property inspections (e.g., an inspection data repository 220) and/or claims information regarding one or more properties 270 (e.g., a claims data repository 260). The inspection data repository 220 may include historical information obtained during one or more property inspections on properties 270 insured, or requested to be insured, by the insurance provider. The claims data repository 260 may include information about whether or not an insurance claim had been filed against one or more different properties. In some cases, the property inspection system 210 may determine whether or not a property inspection had been ordered for a particular property during an insurance quotation process.

In some cases, the integrated risk management system 217 may include an interior inspection determination module, an exterior inspection determination module, and/or the like. In some cases, the integrated risk management system 217 may be used to determine whether to order an interior inspection of a property, an exterior inspection of a property and/or an inspection to determine whether a condition hazard exists in the geographic area near the property. For example, the integrated risk management system 217 may be configured to order an inspection based on a potential hazard, such as a brush fire potential, a flood potential, and the like, associated with the property. In some cases, the integrated risk management system may override an inspection determination (e.g., to inspect or not to inspect) issued by the property inspection decision device 230.

In an illustrative example, insurance consumers may request insurance coverage, or a quotation for insurance coverage from an insurance provider. Each consumer may contact the insurance agent and/or agency 250 for an insurance quotation using one or more methods, such as via a phone call, an email, an internet-based form, an in-person consultation, and/or the like. For example, the insurance consumer may request insurance coverage for one or more properties 270, such as a house 271, multi-dwelling building 272, a unit in a multi-dwelling building and/or a commercial property 273. In response to the request, the insurance agent and/or insurance agency 250 may enter information about the insurance consumer and/or the property to be insured (e.g., the house 271) into an insurance quotation system using a computing device (e.g., a tablet computer 252, a laptop computer 254, a desktop computer, a smart phone, etc.). The insurance quotation system may include software executed locally on the computing device and/or software running at an external location and accessed via a browser application (e.g., a web browser). For example, the insurance agent and/or agency 250 may enter information about the insurance customer (e.g., name, age, income information, employment information, credit information, etc.) and/or the property (e.g., age information, value information, geographical location information, hazard information, etc.) into the insurance quotation system 207.

The insurance quotation system 207 may then process the information received from the insurance agent or agency 250 to determine whether or not to provide insurance for the property. For example, the insurance quotation system 207 may include a tool (e.g., an underwriting tool) to assess a risk associated with insuring the property based, at least in part, on the information entered by agent and/or agency 250. In some cases, rules may be used to determine whether a property inspection of the property may be required before insurance coverage may be provided. For example, a rule may be used that requires that any building associated with the property is to be inspected when the age of the building is greater than a specified threshold (e.g., 10 years, 15 years, etc.). However, in cases when the inspection decision is more complex (e.g., a model-based inspection decision), an insurance agent may not be able to determine whether or not a particular property is to be inspected and, as such, cannot notify the potential consumer during the insurance quotation process.

In some cases, a model-based process is used to determine whether or not to order a property inspection before providing a quotation for insurance coverage of the property. For example, the property inspection decision device 230 may be configured to implement the risk assessment process when determining whether to order a property inspection. As part of the risk assessment process, the property inspection decision device 230 may be configured to process one or more models to provide a near real-time decision about whether or not an inspection may be required during a binding process. This near real-time decision may be communicated from the insurance quotation system 207 to the insurance agent and/or agency 250 via the network 205 for communication to the prospective insurance consumer. As such, the insurance consumer will be notified that any insurance coverage provided by the insurance provider for the property in question may be subject to an inspection, and therefore may be cancelled and/or modified based on information obtained during the inspection. This near real-time decision may provide a more customer-friendly process because the prospective insurance consumer will be notified that any insurance coverage provided by the insurance provider would be subject to an inspection, and therefore may be canceled subject to that inspection, early in the insurance quotation process. Further, by using the model-based process implemented in the property inspection decision device 230, an insurance provider may experience cost savings from reduced property inspection orders and/or reduce exposure to risks of insuring the properties evaluated using one or more different models.

In some cases, an insurance provider may have one or more rules and/or policies associated with a property inspection requirement during an insurance quotation process. For example, the insurance provider may require, or otherwise target, a certain percentage of properties (e.g., about 90%, about 95%, near 100%, etc.) for inspection. In some cases, the insurance provider may have rules and/or policies excluding properties from the inspection process. In such cases, when these rules are triggered, the insurance provider will not order an inspection of the property. In an illustrative example, an insurance provider may have a default rule that all properties, or a sufficiently high percentage (e.g., above 90%, above 95%, near 100%, etc.) of properties are to be inspected. The insurance provider may then have one or more other rules and/or policies that may exclude properties from this inspection rule when certain criteria are met. These criteria may correspond to, for example, an age of the property, a square footage of a property, insurance to value ratio of the property, a geographical location of the property, geographical features near the property, and/or other characteristics. For example, a newer property may have less associated risk than an older property. Also, a home having a smaller square footage may be easier to value than a larger home. In an illustrative example, a home built less within five years of a property insurance quotation request may not trigger an inspection of the home during the quotation process, while a home built over ten years previous may trigger an inspection.

When such rules are used, a large percentage of property inspections may be ordered in relation to a total number of properties for which insurance is sought. As such, the insurance provider may incur a large cost when inspections are required for a high percentage of properties being insured. To reduce these costs, and/or for other reasons (e.g., increasing customer friendliness, reducing times associated with finalizing insurance coverage for properties, etc.) the insurance provider may desire to reduce the total number of inspections ordered, such as by setting an inspection percentage target (e.g., about 75%, about 80%, etc.). This target percentage may then be used by the property inspection system 210 when developing, using and/or adjusting one or more property inspection models.

In some cases, the property inspection determination device 230 (e.g., the computing device 101) may be configured to receive, via a user interface, a request to provide insurance coverage for a property. In some cases, the user interface may be located remotely from the property inspection determination device 230, such as at a geographical location of an insurance agent and/or agency 250, at a call center, or at a location associated with an insurance consumer. The property inspection determination device may then determine an insurability risk score corresponding with a risk of providing insurance coverage for the property using an adaptable inspection model. In some cases, the adaptable inspection model may be provided by the model generator 235. In other cases, an adaptable inspection model (e.g., an initial adaptable inspection model) may be received from an external source (e.g., a user input device, a file, etc.). The adaptable inspection model may include a first model, a second model, and a control model and may be configured to determine an insurability risk score based, at least in part on output from the first model and the second model, such as by using a weighted output of the first model and a weighted output of the second model.

The property inspection determination device 230 may then issue a real-time notification, or near real-time notification, about whether the particular property is to be inspected based on the insurability risk score. For example, the insurability risk score may be compared to a criterion (e.g., a threshold) and if the criterion is met, the property inspection determination device 230 may order an inspection of the property and/or issue the real-time indication that any insurance coverage provided for the property may be subject to an outcome of the inspection. In some cases, the property inspection determination device 230 may order an inspection of the property, such as in response to a decision of the insurance consumer to insure the property with the insurance provider. In some cases, the property inspection determination device 230 may be configured to automatically order an inspection of the property via a communication interface (e.g., a network interface), such as by sending a message to a property inspector 240 to schedule an inspection of the property. In other cases, the property inspection determination device 230 may prompt a user via a user interface (e.g., an employee of the insurance provider) to schedule the property inspection with the property inspector 240. The insurance inspector may conduct an exterior inspection and/or an interior inspection of the properties 270 in response to the inspection request and communicate the results of the inspection to the insurance provider for inclusion in the inspection data repository 220. In some cases, the property inspection determination device 230 may report, such as via the user interface, whether or not the property is to be inspected during an initial conversation with the insurance consumer. Further, the property inspection determination device may report, or otherwise communicate, any results of a completed property inspection.

In some cases, the model generator 235 may be configured for generating and/or adjusting the adaptable inspection model used by the property inspection decision device 230. For example, the model generator 235 may be communicatively coupled to the inspection data repository 220 and/or the claims data repository 260 and use information from the data repositories for generating and/or adjusting inspection models. For example, the model generator 235 may be configured to modify a model and/or adjust one or more weighting factors used by the model.

The property inspection system 210 may be configured to reduce an overall inspection volume, while identifying property condition, liability and/or insurance-to-value concerns at the point of sale (e.g., the insurance agent and/or agency 250). An adaptable inspection model may be used for generating a near real-time decision (e.g., a decision received during an insurance quotation session) about whether any identified concerns may require action (e.g., an ordered property inspection) at the point of sale. The adaptable inspection model may use one or more rating and/or underwriting characteristics to determine whether to order an exterior property inspection. This near real-time decision may be generated based on an inspection volume target (e.g., approximately 80%, approximately 85%, etc.), underwriting regulations (e.g., inspecting according to an age or a value of a property), overall cost (e.g., limiting costs under a particular value), and/or a desire to more heavily weight condition hazard risks or insurance-to-value risks. For example, in a particular geographic region, a condition hazard risk (e.g., a flood risk) may be more heavily weighted than an insurance-to-value risk (e.g., an insurance-to-value ratio).

In some cases, the adaptable inspection model may include one or more components. In an illustrative example, the adaptable inspection model may include a first model (e.g., a static model) generated using historical inspection data obtained over a defined time period (e.g., about six months). A second model may use similar policy characteristics to the first model, but may include an ability for self-learning and may be capable of being revised over time, such as by adjusting a weighting factor associated with either the first model and the second model. In some cases, the adaptable inspection model may include a third, rules based, determination. For example, a rule may be defined that a specified percentage of a total number of inspections may be randomly selected for inspection 100% of the time. In other cases, one or more business rules and/or regulations may require that a property, when certain requirements are met, is subject to a 100% inspection rate. For example, a business rule or regulation may exist that may require a property to be inspected when an age or a value meets a criterion, such as being greater than a defined threshold. These business rules may be used to minimize sampling bias, prevent manipulation of characteristics, and/or to ensure legal and regulatory considerations are met. The overall inspection decision may be determined using one or more weighting factors to more heavily weight a particular parameter.

Figure 3:
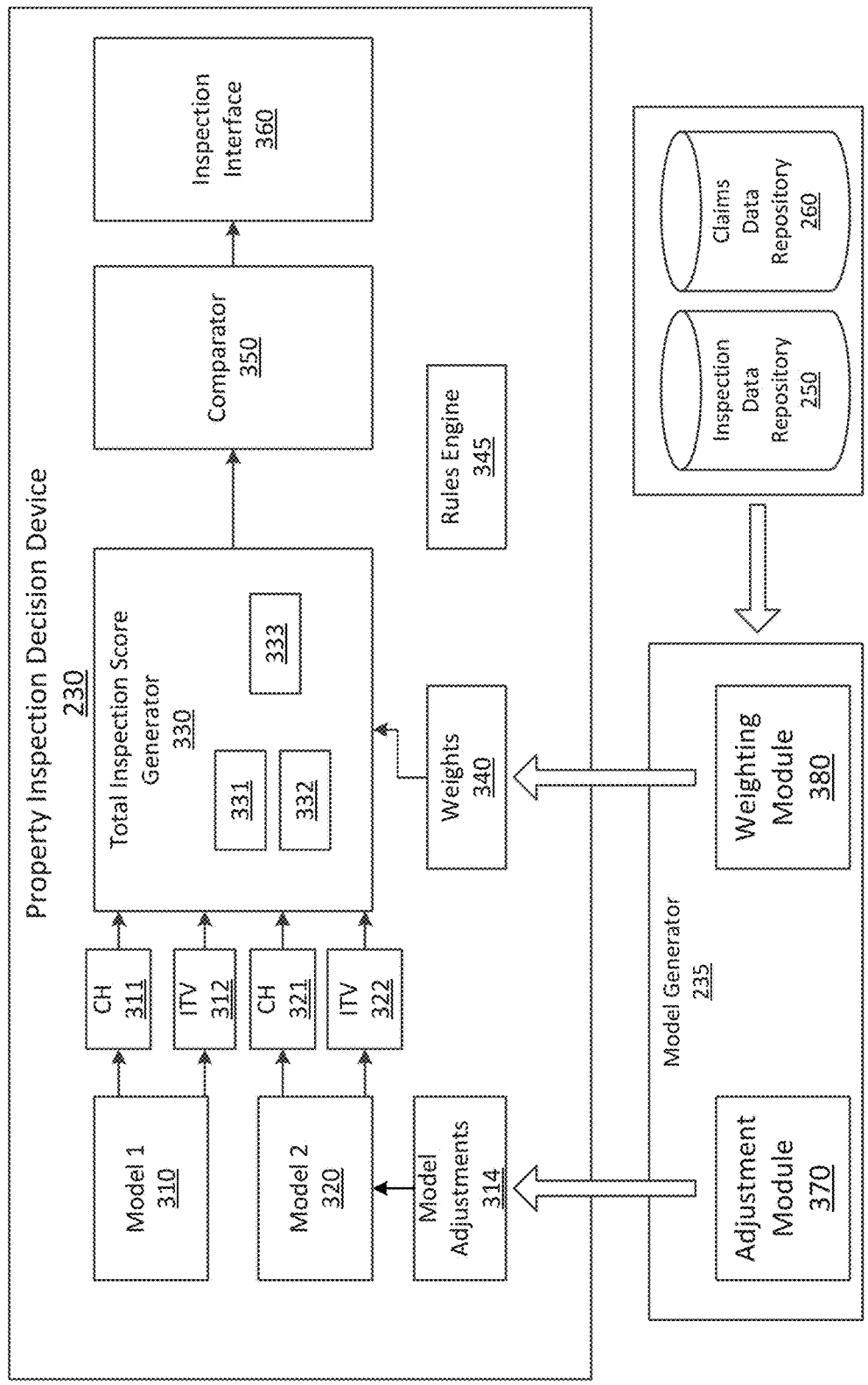
FIG. 3 shows a block diagram representation of illustrative devices for determining whether or not to order an inspection of a property, according to one or more aspects of the disclosure.

FIG. 3 shows a block diagram representation of illustrative devices (e.g., the property inspection decision device 230 and the model generator 235 for determining whether or not to order an inspection of a property, according to one or more aspects of the disclosure. As mentioned above, the property inspection decision device 230 may be configured to use an adaptable inspection model. In some cases, a rules engine 345 may be used for determining whether one or more rules (e.g., a regulatory rule, a random selection) may warrant an inspection of the property. The adaptable inspection model may include at least a first model 310 and a second model 320. These models may be configured to output an insurability risk score based on a weighted combination of the output of a "condition hazard" model 311, 321 and an output of an "insurance-to-value (ITV)" model 312, 322. For example, the condition hazard model 311, 321 may be configured to identify potential physical condition issues and/or liability issues (e.g., roof, foundation, doors, dry rot, discarded vehicles, dogs and/or viscous animals, broken and/or cracked glass, attractive nuisances such as a trampoline, or a swimming pool, etc.) associated with the property, while the insurance-to-value model 312, 322 may be configured to identify any discrepancy between a home value and a limit to a desired insurance coverage limit. For example, an insurance-to-value calculation may correspond to a replacement cost corresponding to a square footage of a property (e.g., dimensions, a number of stories, etc.), a house type, etc. In some cases, the replacement cost may increase following an inspection.

The condition hazard model 311, 321 may comprise a combination of a number of parameters (e.g., property age, limit of insurance, etc.) and a relative importance (e.g., a weighting factor) associated with each of the parameters. In an illustrative example, a condition hazard model may associate a higher importance to home age (e.g. about 0.6), and a lesser importance to a limit of insurance (e.g., about 0.37). The condition hazard model 311, 321 may include one or more other variables associated with a particular geographical area and/or policy characteristics. Each variable may be given a weight based on the geographical area associated with the property. The weightings associated with an ITV score may weight limit of insurance highly (e.g., about 0.8) greater than home age (e.g., about 0.3). The insurance-to-value model 312, 322 may include one or more other variables associated with a particular geographical area and/or policy characteristic.

An inspection score generator 330 may be used to combine a condition hazard score produced by the condition hazard model 311 and an insurance-to-value score produced by the insurance-to-value model 312 associated with the first model 310 into a first model score, where the first model score may be a weighted combination of the condition hazard score and the insurance-to-value score. Likewise, a condition hazard score calculated using the condition hazard model 321 and an insurance-to-value score calculated using the insurance-to-value model 322 of the second model 320 may be combined into a second model score as a weighted combination of the condition hazard score and the insurance-to-value score. The inspection score generator 330 may then generate a total inspection score 333 as a weighted combination of the first model score 331 and the second model score 332. This total inspection score 333 may be compared to a criterion (e.g., a threshold) by the comparator 350. Based on the comparison, the property inspection decision device 230 may initiate an inspection of the property using the inspection interface 360. Regardless of whether an inspection order is generated, a real-time decision is communicated to the originating insurance agent and/or agency 250 for communication to the insurance consumer during an initial consultation.

The model generator 235 may include one or more components, such as the adjustment module 370 and a weighting module 380. The adjustment module 370 may be configured to generate one or more adjustment for one or more of the first model 310 or the second model 320. The weighting module may be configured to generate one or more weighting factors 340. In some cases, the weighting factors may be based on a geographical location, such as by associating a first set of weights to a first geographical region and a second set of weights for a second geographical region. For example, for property insurance quotations originating in a first state may have equal weights (e.g., 50/50) associated with the combination of the condition hazard and insurance-to-value scores and/or a combination of the first model score 331 and the second model score 332. For a second state, different weighting factors may be used. For example, equal weighting factors may be used when combining the first condition hazard score 311 (e.g., 50%) and the first insurance-to-value score 312 (e.g., 50%), while different weighting factors may be used to combine the second condition hazard score 321 (e.g., 25%) with the second insurance-to-value score 322 (e.g., 75%). In some cases, for a given geographical region, a set of weightings (e.g., 40% of the condition hazard score and 60% of the insurance-to-value score), may be used for both the first model and the second model. In other cases, each model may be associated with a different set of weightings, even in the same geographical region. In some cases, a weighting of 0% may be used with a particular model to provide a result without considering any results output by that particular model. In doing so, and in combination with the randomly selected inspections and the rules-based inspections, the property inspection decision device 230 may identify a specified percentage (e.g., between about 75% to about 85%, etc.) of new property insurance business for inspections.

Over time, the model generator 235 may monitor, analyze and/or otherwise use inspection data stored in the inspection data repository 220 and claims data stored in the claims data repository 260. The adjustment module 370 may be used to generate one or more model adjustments 314 for adjusting one or both of the first model 310 and the second model 320. For example, the model adjustments 314 may include modifying one or more weighting factors associated with the condition hazard parameters and/or the insurance-to-value parameters. In some cases, the model adjustments 314 may include one or more different parameters used for determining the condition hazard scores 311, 321 and/or the insurance-to-value scores 312, 322.

Figure 4:
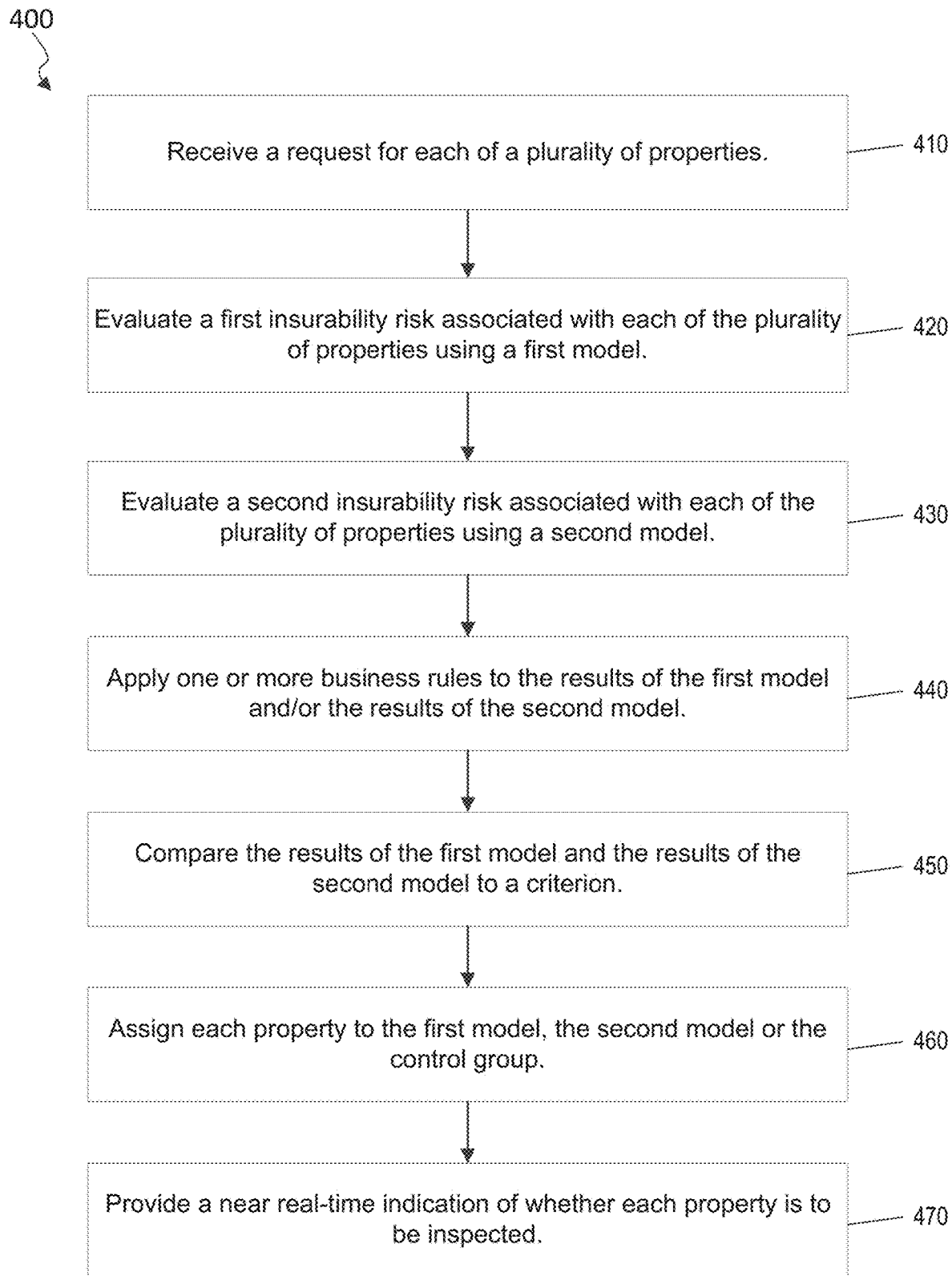
FIG. 4 shows illustrative methods for determining whether or not to order an inspection of a property, according to one or more aspects of the disclosure.

FIG. 4 shows an illustrative method 400 for determining whether or not to order an inspection of a property, according to one or more aspects of the disclosure. The method 400 may begin at 410 when a request for property insurance for each of a plurality of properties may be received by a computing device, such as the property inspection decision device 230. At 420, a first insurability risk associated with each for the plurality of properties may be determined using a first model (e.g., a fixed model). For example, the first model may include calculating a first condition hazard score based on a condition hazard model and calculating a first insurance-to-value score based on an insurance-to-value model and combining the first condition hazard score and the first insurance-to-value score to form a first insurability risk score (e.g., a value between 0 and 100) using one or more first weighting factors. At 430, a second insurability risk associated with each for the plurality of properties may be determined using a second model (an adjustable model). For example, the second model may include calculating a second condition hazard score based on a condition hazard model and calculating a second insurance-to-value score based on an insurance-to-value model and combining the second condition hazard score and the second insurance-to-value score to determine a second insurability risk score using one or more second weighting factors. The first weighting factors may be the same as, or different than, the second weighting factors. In some cases, the weighting factors may be configured to minimize costs associated with providing property insurance for a plurality of properties and/or to identify a maximum number of potential property issues (e.g., 5 property issues, 10 property issues, etc.) associated with providing property insurance for a plurality of properties.

At 440, one or more business rules may be applied to the first insurability risk score output from the first model and/or the second insurability risk score output from the second model. These business rules may be used to minimize sampling bias, prevent manipulation of characteristics, and/or to ensure legal and regulatory considerations are met. For example, the one or more regulations associated with insurance underwriting may be applied to the property insurance request. At 450, the property inspection decision device may compare one or more of the first insurability risk score and the second insurability risk score to a criterion (e.g., a threshold), such as to determine whether or not an inspection is to be ordered for each of the plurality of properties. For example, the first model and the second model may be used to evaluate the insurability risk associated with a particular property. In the illustrative case, the first model may return an insurability risk score of 70, and the second model may return an insurability risk score of 72. At step 450, these insurability risk scores may be compared to a criterion (e.g., a threshold of 71). In cases where the insurability risk score is above the threshold, an inspection of the property may not be necessary, while if the insurability risk score is at or below the threshold, then an inspection may be ordered.

At 460, each of the plurality of properties may be assigned to one of the first model, the second model and a control group. In some cases, the properties may be randomly assigned, assigned based on a distribution (e.g., 10% to the control group, 30% to the first model and 60% to the second model). Based on which model a property was assigned, at 470 a real-time (or near real time) indication of whether each property is to be inspected is provided to an insurance agent and/or agency associated with the particular property.

Figure 5:
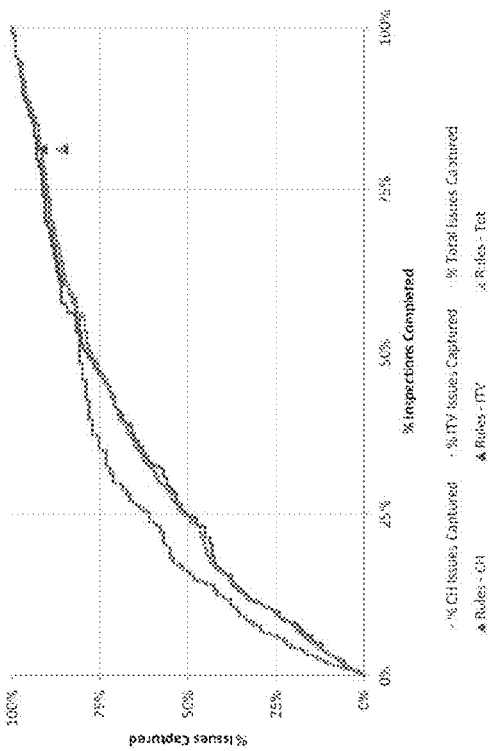
FIGS. 5 and 6 show illustrative data comparing a rules-based model performance with an adaptive model performance for properties in a first geographical region and in a second geographical region.
Figure 5:
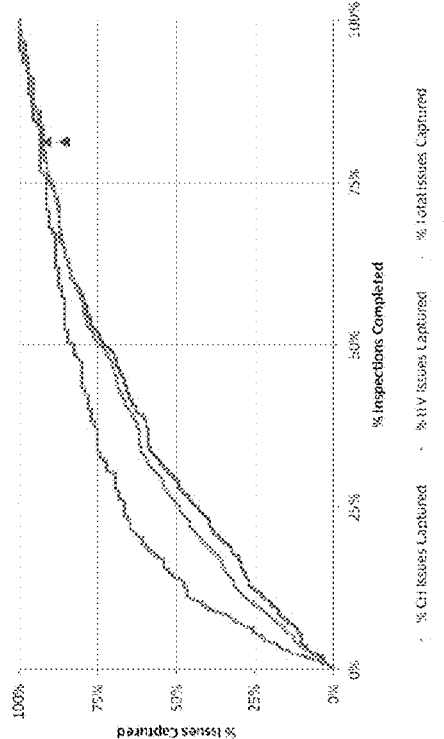
Figure 6:
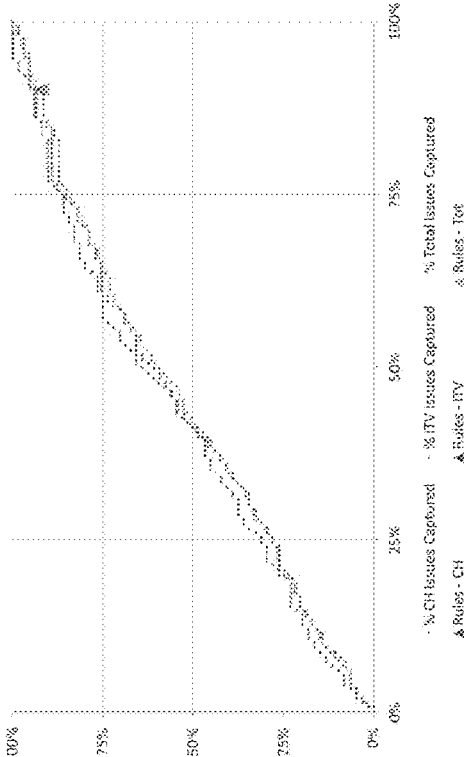
Figure 6:
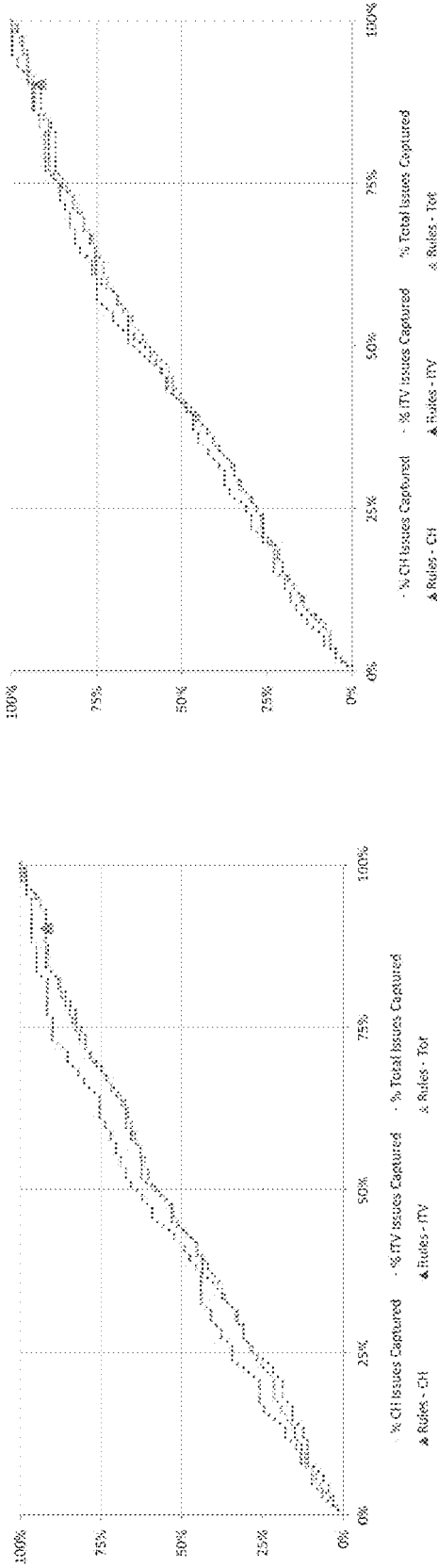

FIGS. 5 and 6 show illustrative data comparing a rules-based model performance with an adaptive model performance for properties in a first geographical region (e.g., FIG. 5) and in a second geographical region (e.g., FIG. 6). As can be seen, results obtained from the adaptive inspection model may be dependent on one or more characteristics of the geographical region near the property. For example, in FIG. 5, the adaptive model performance is illustrated based on different weightings of the first model 310 and the second model 320. For example, 500 and 550 show a model performance comparison between a rules based model and the adaptive inspection model are shown for a first geographical region combining the condition hazard score the insurance-to-value score. 600 and 650 show a model performance comparison between the rules based model and the adaptive inspection model for a second geographical region.

Figure 7:
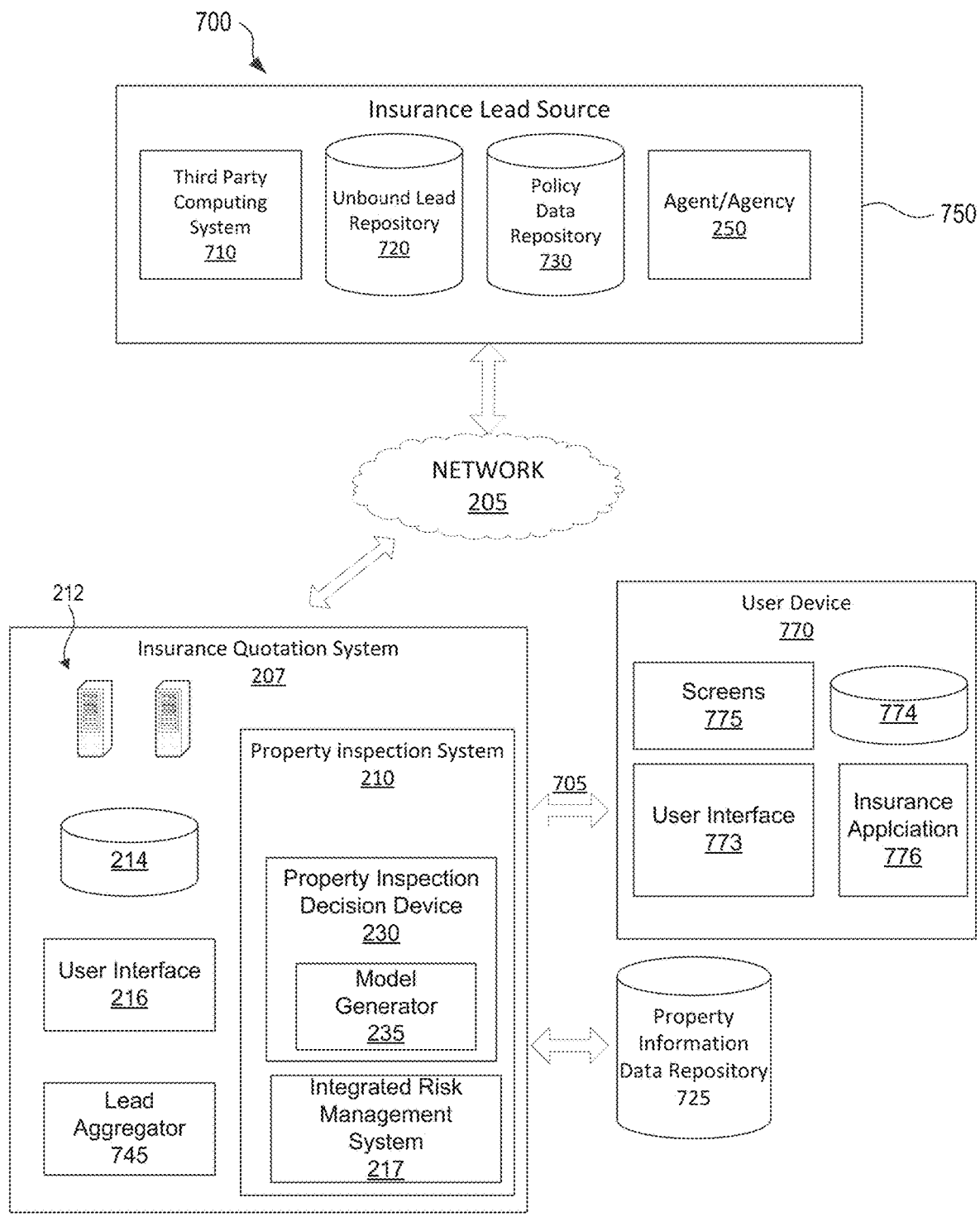
FIG. 7 shows a block diagram representation including devices of an illustrative property inspection determination system, according to one or more aspects of the disclosure.

FIG. 7 shows a block diagram representation including devices of an illustrative property inspection determination system 700, according to one or more aspects of the disclosure. The property inspection determination system 700 may be configured to analyze a plurality of insurance leads to determine whether a property associated with each of the plurality of leads would likely require (or not require) an inspection before obtaining property insurance for the property. The property inspection determination system 700 may include one or more insurance lead sources 750, an insurance quotation system such as the insurance quotation system 207, a user device that may be local to the insurance quotation system or remote from the insurance quotation system and/or a property information data repository 725.

The insurance lead sources 750 may include one or more different sources for property insurance leads that may be used for identifying individuals who may be interested in purchasing property insurance. Once identified, the insurance quotation system 207 may be configured to communicate one or more identified insurance leads to a business unit of the insurance provider (e.g., a marketing organization, an insurance agency, an insurance agent, etc.) in the interests of generating an insurance quotation. In many cases, insurance quotation system 207 may process large amounts of data that may be impractical, for humans to analyze without the use of a specialized computing system to enable timely analysis of the property insurance leads, while minimizing associated costs.

In some cases, the insurance lead source 750 may include one or more different data repositories and/or computing systems that may be used to provide insurance leads to the insurance quotation system 207, such as via the network 205. These insurance lead sources 750 may include data repositories and/or computing systems internal to an insurance company network. The insurance lead sources 750 may include one or more insurance lead sources external to the insurance company. In an illustrative example, the insurance lead sources 750 may include a third-party computing system 710, a data repository storing previously quoted, but unbound leads (e.g., an unbound lead repository 720), a data repository corresponding to active policy holders that may or may not already have purchased a property insurance policy (e.g., a policy data repository), and/or the a computing system associated with an insurance agent or agency 250.

In an illustrative example, the insurance company may partner with, or otherwise enter into a business arrangement with, a third-party organization that is in the business of generating insurance leads. These third-party organizations may utilize the third-party computing system 710 to generate, analyze, or otherwise qualify one or more insurance leads that may be utilized by the insurance company to contact potential customers likely to be interested in purchasing a property insurance policy. In some cases, a plurality of insurance leads may be communicated from the third-party computing system via a wired or wireless link (e.g., the network 205, the Internet, a telecommunications network, etc.) to the insurance quotation system 207. The insurance leads may be for inclusion in an insurance lead marketplace, either before or after a determination has been made whether a property inspection would be necessary for a property associated with a particular insurance lead. An illustrative lead marketplace is discussed in the co-pending patent application Ser. No. 14/457,763 entitled "Insurance Lead Marketplace", which is included in its entirety by reference. An indication whether or not a particular property would be subject to a property inspection during the insurance quotation process may be used to enhance the insurance lead in the insurance lead marketplace. Such indications may provide an incentive for an agent or agency to purchase a plurality of leads or may be used to enhance the value of the insurance lead.

In some cases, the unbound lead repository 720 may be used to store a plurality of previously quoted insurance leads that, for some reason, have remained unbound. The unbound lead repository 720 may include information corresponding to one or more unbound property insurance quotations. In some cases, the unbound lead repository 720 may include a plurality of other unbound insurance leads and/or quotations different than a property insurance quotation, such as a vehicle insurance quotation, a boat insurance quotation, a life insurance quotation, and the like. Such insurance quotations may be associated with a customer address (e.g., a residence address, a business address, etc.) for which a determination may be made whether or not a property inspection would likely be necessary during a property insurance quotation process. As such, information stored in the unbound lead repository 720 may be communicated to, or otherwise accessed by the property inspection decision device 230 and used to identify a property insurance lead.

Similarly, the policy data repository 730 may store information corresponding to one or more insurance policies that have been sold by the insurance provider. The information may include property insurance information (e.g., a primary residence, a secondary residence, a vacation home, a business property, and the like), life insurance information, renter's insurance information, health insurance information, vehicle insurance information (e.g., automobile insurance, boat insurance, airplane insurance, motorcycle insurance, recreational vehicle insurance, and the like). In some cases, the information in the policy data repository 730 may be communicated, or otherwise accessed by, the insurance quotation system 207 to be analyzed to determine whether or not a property associated with an insurance policy would require an inspection during a property inspection quotation process. In some cases, the policy holders associated with the insurance policy information stored in the policy data repository 730 may not hold a property insurance policy provided by the insurance provider or may be interested in purchasing an additional property insurance policy for the same or an additional property. As such, an indication that a property insurance inspection may not be required may provide incentive for the insurance policy holder to apply for and/or purchase a new property insurance policy.

As discussed above, the insurance agent and/or agency 250 may prepare an insurance quotation in response to a request from a customer. As part of the insurance quotation process, the property inspection decision device 230 may be used to generate a near real-time indication of whether or not a property inspection would be required for the property associated with the insurance quotation. In some cases, however, the insurance agent and/or agency may also provide a plurality (e.g., a list, etc.) of insurance leads to determine whether one or more of the insurance leads may be used in generating a quote for property insurance, such as by using an indication whether or not the property to be insured may require an inspection during the insurance quotation process. In some cases, the insurance quotation system may be in communication with a real estate database (not shown), such as a multiple listing service or other such data repository associated with a real estate agent, a realtor, a developer, and the like. The real estate database may be used in addition to or instead of one or more of the other sources 750. In some cases, the real estate database may be configured to provide a list of properties that may be for sale or offered for sale. The list of properties may then be analyzed by the property inspection decision device 230 to determine whether or not an inspection would be required as part of an insurance quotation process.

The insurance quotation system 207 may then process the information received from the insurance agent or agency 250 to determine whether or not to provide insurance for the property. For example, the insurance quotation system 207 may include a tool (e.g., an underwriting tool) to assess a risk associated with insuring the property based, at least in part, on the information associated with one or more of the plurality of leads provided by one or more of the lead sources 750. In some cases, rules may be used to determine whether a property inspection of the property may be required before insurance coverage may be provided. For example, a rule may be used that requires that any building associated with the property is to be inspected when the age of the building is greater than a specified threshold (e.g., 10 years, 15 years, etc.). However, in cases when the inspection decision is more complex (e.g., a model-based inspection decision), an insurance agent may not be able to determine whether or not a particular property is to be inspected and, as such, cannot notify the potential consumer during the insurance quotation process. By allowing an insurance agent to identify which insurance leads may not require an inspection, the insurance agent may be more likely to purchase and/or generate a quotation for property insurance for such leads.

In some cases, a model-based process may be used to determine whether or not to order a property inspection before providing a quotation for insurance coverage of the property associated with each of the plurality of insurance leads provided by the lead sources 750. For example, the property inspection decision device 230 may be configured to implement the risk assessment process when determining whether to order a property inspection. As part of the risk assessment process, the property inspection decision device 230 may be configured to process one or more models to provide a decision about whether or not an inspection may be required during a binding process. This decision may be communicated from the insurance quotation system 207 to an insurance agent and/or agency 250 via the network 205 for communication to the prospective insurance consumer. In some cases, the decision about whether or not an inspection may be required may be stored as an indicator (e.g., a flag, an insurability risk score, etc.) associated with each of the plurality of leads received form the lead sources 750. As such, a lead aggregator 745 may be configured to aggregate a different plurality of insurance leads for which the indicator meets a criterion. For example, the lead aggregator 745 may be configured to generate a first list of leads for which the indicator corresponds to an affirmative flag indicative where the property associated with a particular lead would not require an inspection during the property inspection process. In some cases, the lead aggregator 745 may be configured to generate a second list of leads for which the indicator indicates that the property associated with a particular lead would require an inspection during the property inspection process.

In some cases, an insurance provider may have one or more rules and/or policies associated with a property inspection requirement during an insurance quotation process. For example, the insurance provider may require, or otherwise target, a certain percentage of properties (e.g., about 90%, about 95%, near 100%, etc.) for inspection. In some cases, the insurance provider may have rules and/or policies excluding properties from the inspection process. In such cases, when these rules are triggered, the insurance provider will not order an inspection of the property. In an illustrative example, an insurance provider may have a default rule that all properties, or a sufficiently high percentage (e.g., above 90%, above 95%, near 100%, etc.) of properties are to be inspected. The insurance provider may then have one or more other rules and/or policies that may exclude properties from this inspection rule when certain criteria are met. These criteria may correspond to, for example, an age of the property, a square footage of a property, insurance to value ratio of the property, a geographical location of the property, geographical features near the property, and/or other characteristics. For example, a newer property may have less associated risk than an older property. Also, a home having a smaller square footage may be easier to value than a larger home. In an illustrative example, a home built less within five years of a property insurance quotation request may not trigger an inspection of the home during the quotation process, while a home built over ten years previous may trigger an inspection. In some cases, such information may be stored in a property information data repository 725 which may be accessible via a network (e.g., the network 205, the Internet, a telecommunications network, etc.).

When such rules are used, a large percentage of property inspections may be ordered in relation to a total number of properties for which insurance is sought. As such, the insurance provider may incur a large cost when inspections are required for a high percentage of properties being insured. To reduce these costs, and/or for other reasons (e.g., increasing customer friendliness, reducing times associated with finalizing insurance coverage for properties, etc.) the insurance provider may desire to reduce the total number of inspections ordered, such as by setting an inspection percentage target (e.g., about 75%, about 80%, etc.). This target percentage may then be used by the property inspection system 210 when developing, using and/or adjusting one or more property inspection models. Further, the target percentage may be used when generating a list of properties for which an inspection is not to be ordered during a property inspection process.

In some cases, the lead aggregator 745 may be configured to compare an insurability risk score associated with each of the plurality of leads to one or more criteria when generating one or more lists of leads that may be provided for display at a user device. An insurability risk score may be generated by the property inspection decision device 230 for each property associated with the plurality of leads received from the lead sources 750, similarly to the process discussed above. In an illustrative example, the insurability risk score may be generated using a defined scale, where a score of 0 may correspond to a decision that an inspection is required for a particular property and a score of 100 may correspond to a decision that a property inspection is not required for the particular property. In some cases, an insurability risk score between 0 and 100 may be generated to correspond to a likelihood that an inspection would not be necessary as determined by one or more of the models utilized by the property inspection decision device. Based on this, the lead aggregator 745 may generate one or more lists of leads corresponding to a likelihood whether a particular lead of the plurality of leads received from the lead sources 750 may require a property inspection during a property insurance quotation process.

In an illustrative example, the lead aggregator 745 may compare the insurability risk score associated with the plurality of leads to one or more different criteria. For example, the lead aggregator may be configured to use an insurability risk score threshold (e.g., 75) in classifying leads as those for which an inspection is not necessary and/or for which an inspection would be necessary. In this illustrative example, the lead aggregator 745 may define a list, or otherwise group, the leads for which the score meets or exceeds the threshold as a "non-inspection lead list." Similarly, the lead aggregator 745 may define a list, or otherwise group, the leads for which the score does not meet the threshold criterion as an "inspection lead list." In another illustrative example, the lead aggregator 745 may be configured to generate one or more lists of leads corresponding to a likelihood that a property inspection may be required for a particular property during a property inspection quotation process. For example, the lead aggregator 745 may be configured to use two or more criteria for comparison to the insurability risk score for each of the plurality of leads. For example, the lead aggregator 745 may define a set of rules where if the insurability risk score (ISR) is:

| | |
|---|---|
| ISR ≤ Threshold_1 (e.g., 30) | Leads likely to require a property inspection |
| Threshold 1 < ISR > Threshold 2 | Leads may or may not require a property inspection |
| ISR ≥ Threshold_2 (e.g., 80) | Leads likely not to require a property inspection |

As can be seen, the lead aggregator 745 may be configured to generate one or more lists of leads based on a likelihood that an inspection may be required during a property insurance quotation process. As such, each list of leads may be used to identify leads having a greater likelihood to bind when receiving a quotation for property insurance.

In some cases, the lead aggregator 745 may be configured to provide access to the one or more lists of property insurance leads to a remote user, such as by a user device 770. The user device may be associated with an insurance agent/agency, a realtor, a real estate development company, or other such users that may utilize the information in a property insurance lead list as an incentive when selling a property insurance policy, a real estate property, and the like. The user device 770 may include a personal computer, a tablet computer, a smart phone, and/or the like. This user device 770 may include a processor configured to run computer executable instructions to configure the user device 770 as a special purpose device for displaying and/or otherwise accessing a plurality property insurance leads for use in generating a quotation for property insurance. In an illustrative example, the user device 770 may include a processor (not shown), one or more memory devices 774, a user interface 773, and/or an insurance application 776. Computer executable instructions for implementing the insurance application 776 may be stored in the one or more memory devices 774 and executed by the processor to provide one or more insurance functions, such as presenting a plurality of property insurance leads to a user via the user interface 773 via one or more user interface screens 775.

In some cases, the user device 770 may be communicatively coupled to the insurance quotation system 207 via a communication link, such as the network 205 or the Internet 705. The insurance application 776 may communicate with the lead aggregator to receive one or more lists of property insurance leads. This communication of information associated with the one or more lists of property insurance leads may be done periodically (e.g., daily, weekly, monthly, etc.) or in response to a user input received via the user interface 773. In some cases, the lead aggregator 745 and/or another component of the property inspection system 210 may communicate one or more lead lists to the user device 770 via the communication link 705. The plurality of property insurance leads (e.g., one or more lists of property insurance leads) may be communicated to the user device 770 for access by the insurance application 776 as a file that may be stored locally to the user device in the one or more memory devices 774. In other cases, the plurality of property insurance leads may be stored in the memory 214 of the insurance quotation system and a link to the file storage location may be communicated to the user device 770 via the communication link 705.

In an illustrative example, the user interface screens 775 may be used to present a list of leads, such as the aggregated lead lists as generated by the list aggregator 745, as a table, a list and/or a grid of insurance leads. In some cases, one or more user interface screens may be configured to present a visual indication of a location of individual property insurance leads and/or a location of an insurance agency plotted on a map and/or one or more map overlays. In some cases, an indication of whether or not a particular property insurance lead may require a property inspection during the inspection process may be indicated using a visual indicator such as a color (e.g., red—inspection required, green—inspection waived, yellow—indeterminate, etc.) and/or a shape (e.g., square—inspection required, circle—inspection waived, triangle—indeterminate, etc.). Similarly, a location of an insurance agent/agency may also be indicated on the user interface screen such as by using a color (e.g., blue, etc.) and/or a shape (e.g., a star).

In some cases, the user interface screens 775 may be generated by the lead aggregator, the property inspection decision device 230 and/or one or more other components of the property inspection system 210 or the insurance quotation system 207. When generated by a component of the insurance quotation system 207, the user interface screens may be communicated to the user device 770 via the communication link 705 for display on a display device (e.g., a touch screen, an LED screen, a LCD screen, a cathode ray tube screen, etc.) of the user interface 773. A screen generator may be used to format lists of property insurance leads for display to a user via the user interface 773 of the user device 770. In some cases, the same information may be presented in different formats, such as a table, a map, a list, and the like. For example, the screen generator may generate a user interface screen corresponding to a list or table of property insurance leads, where different information may be displayed. In an illustrative list example, the property insurance leads may be listed by one or more of name, address, insurability risk score, an indication about whether a property inspection would be required, and the like. Further information may be linked to the list such as by using a link to a second user interface screen (e.g., a property insurance lead detail user interface screen) displaying further information (e.g., an age, an income level, an employment history, whether additional insurance is already held, an address of a local insurance agent/agency, whether property insurance coverage has previously been quoted, etc.) about a particular property insurance lead. In an illustrative tabular user interface screen, the plurality of property insurance leads may be listed in tabular form, where the table may include two or more different columns to display information about individual leads. Illustrative columns may include a name, an address, an indication about whether a property inspection would be required, an insurability risk score, and the like. Other information for each of the plurality of links may be presented, for example, via a link to the detail user interface screen discussed above.

In some cases, the user interface screens 775 may be configured to show a graphical representation of the property insurance lead lists generated by the lead aggregator 745. For example, the insurance application 776, the lead aggregator, a screen generator or the like may process instructions to generate a map-based user interface screen to facilitate display of the plurality of property insurance leads to a user. For example, the insurance application 776 may access a list of property insurance leads stored in a memory device (e.g., the one or more memory devices 704, the data repository 214, etc.) either directly or via a link. The insurance application 776 may identify an address associated to each of the plurality of property insurance leads to identify a geographic location on the map to display information about each property insurance lead. In some cases, the location of each property insurance lead may be configured to be displayed on a map, where an indication of whether or not a property inspection would be necessary may be displayed at the identified geographic location. For example, the insurance application 776 may analyze the plurality of property insurance leads to determine which of the plurality of leads may indicate that a property inspection would not be necessary, which of the plurality of leads may indicate that a property inspection would be required, and which of the plurality of leads correspond to an indeterminate indication regarding whether the property inspection would be required. In some cases, a geographic location for each of the plurality of leads may be placed on the same map. In other cases, the leads may be placed on different overlays which may correspond to the indication of whether or not a property inspection is necessary. When overlays are used, an option may be presented to the user via the user interface to selectively display each overlay, either alone or in combination with one or more other map overlays.

In some cases, the indication of whether or not a particular property insurance lead may require a property inspection during the inspection process may identified remotely from the user device 770, such as by the lead aggregator 745 and/or the property inspection decision device 230. In other cases, the insurance application 776 may analyze information associated with each of the plurality of property insurance leads to determine how each lead may be presented to the user. For example, the insurance application may be configured to use a visual indicator such as a color (e.g., red—inspection required, green—inspection waived, yellow—indeterminate, etc.) and/or a shape (e.g., square—inspection required, circle—inspection waived, triangle—indeterminate, etc.) to display information about each lead. For example, the insurance application may compare an insurability risk score to one or more thresholds to determine an inspection requirement status. For example, the insurance application may determine that a property insurance lead may be assigned an indicator indicative that a property inspection is not required when the associated insurability risk score is equal to or greater than a defined threshold. Similarly, the insurance application may determine that a property insurance lead may be assigned an indicator indicative that a property inspection is required when the associated insurability risk score is less than the same threshold or less than or equal to a different threshold. In some cases, the insurance application may display an indication that a property inspection requirement may be indeterminate, such as when the associated insurability risk score is greater than a threshold indicative of requiring an inspection, but less than a different threshold indicative of not requiring an inspection. For example, a threshold RI may correspond to a threshold indicative of requiring a property inspection, a threshold NI may correspond to a threshold indicative that no property inspection would be required, and the variable IRS may correspond to an insurability risk score for a particular property insurance lead, where indeterminate leads may be identified using the formula RI<IRS<NI. In an illustrative example, a property insurance lead may be plotted using a particular color (e.g., green), a particular shape (e.g., a star), or both to indicate that no inspection may be required. Similarly, a property insurance lead may be plotted using a particular color (e.g., red), a particular shape (e.g., a circle), or both to indicate that an inspection may be required for that particular lead, or may be plotted using a particular color (e.g., yellow), a particular shape (e.g., a triangle), or both to indicate that the insurability risk score is not indicative of either requiring or not requiring an inspection of a particular property.

In some cases, the lead aggregator 745 and/or the insurance application 776 may analyze information associated with each of the plurality of leads to determine property inspection characteristics associated with a geographic area. For example, the lead aggregator 745 (or the insurance application 776) may be configured to identify a plurality of property insurance leads associated with a particular geographic area (e.g., a zip code, a neighborhood, a property development, an industrial park, a town, a village, a city, a county, etc.). The characteristics of the identified leads may be analyzed using criteria to determine a number of property insurance leads within the particular geographic area that may require or not require a property inspection during a property inspection quotation process. The lead aggregator 745 may use further criteria when generating a user interface screen for presenting this information. For example, when a criterion representative of a certain number (e.g., a threshold number of properties) of properties are indicated as not requiring a property inspection is met, the geographic region may be marked to show this feature. Similarly, when a criterion representative of a certain number (e.g., a threshold number of properties) of properties are indicated as requiring a property inspection is met, the geographic region may be marked to show this feature. In some cases, the threshold condition may correspond to a number of properties that are indicated as not requiring a property inspection, a number of properties that are indicated as requiring a property inspection, and/or a difference between a number of properties that require an inspection and a number of properties that do not require an inspection.

In an illustrative example, the lead aggregator 745 or insurance application 776 may analyze characteristics of properties within a particular geographic region, such as a zip code. For properties associated with the zip code, an associated indication of whether or not a property inspection would be required is analyzed to determine a number of properties that may require the property inspection and a number of properties that do not require an inspection. The geographic region may be marked on a user interface screen as not requiring property inspection if a greater number of properties would not require a property inspection. For example, the difference between a number of properties requiring a property inspection and a number of properties not requiring a property inspection may be determined. In some cases, the difference may be directly used in generating the user interface screen. For example, if the difference indicates that more properties require a property inspection, then the geographic area may be marked as such by coloring the geographic area a particular color (e.g., red), using a particular pattern (e.g., cross hatched), and/or the like. Similarly, if the difference indicates that more properties do not require a property inspection, then the geographic area may be marked as such by coloring the geographic area a particular color (e.g., green), using a particular pattern (e.g., a solid color), and/or the like.

In some cases, the difference may be compared to one or more thresholds before the geographic area is marked on the user interface screen. For example, one or more rules may be defined to determine when a particular geographic area may be indicated as requiring or not requiring a property inspection. In some cases, the thresholds may be defined to indicate that a greater number of properties are associated with a particular indication than not. For example, a threshold may be defined such that a difference between the number of properties requiring an inspection and a number of properties not requiring an inspection is above a certain number (e.g., greater than 5, greater than 10, greater than 20, etc.) before the geographic area is marked on the user interface screen. In some cases, a same threshold, or different thresholds may be used to indicate whether a geographic region may be likely include properties that require a property inspection or may be likely not to require a property inspection during a property insurance quotation process. For example, a threshold difference (e.g., 5, 7, 10, etc.) may be defined such that a difference between properties requiring a property inspection and not requiring a property inspection must be greater than the particular threshold before being marked on the user interface screen.

In some cases, insurance application 776 may be configured to generate a user interface screen, or to modify an existing user interface screen to show a location of an insurance agent/insurance agency in relation to geographic regions and/or property insurance leads indicators as discussed above. For example, a location of an insurance agent/agency 250 may also be indicated on the user interface screen such as by using a color (e.g., blue, etc.) and/or a shape (e.g., a star). In some cases, the location of the insurance agent/agency 250 may be selectively placed on the user interface screen based on a user preference and/or a system preference. In some cases, these locations may be included on a same user interface screen map, on a same map overlay, or on a separate map overlay generated to show only the location of insurance agents or insurance agencies. In some cases, the insurance application 776 may process instructions to analyze the location of property insurance leads that require or not require property inspections to predict a likely location for locating an insurance agent or insurance agency to service a particular geographic region (e.g., a zip code, a town, an area code, etc.). For example, when a number of property insurance leads not requiring a property inspection is greater than a defined threshold (e.g., 20 property insurance leads, 100 property insurance leads, etc.) a proposed location for locating an insurance agent or agency to service that particular geographic region may be positioned on a map displayed on a user interface screen. In an illustrative example, a proposed location of an insurance agent or agency may be identified by determining a desired distance (e.g., an absolute distance, a driving distance, a walking distance) between an insurance agent and a property. By identifying a location of the different property insurance leads within the geographic region, one or more proposed locations for a new insurance agent or agency may be shown on the map by identifying an average distance between a majority of the properties (e.g., a majority of properties located within 5 miles of the insurance agent or agency), identifying a rental cost associated with commercial properties within the geographic region (e.g., a cost within a range near an average commercial space rental cost for the geographic area), and/or the like.

Figure 8:
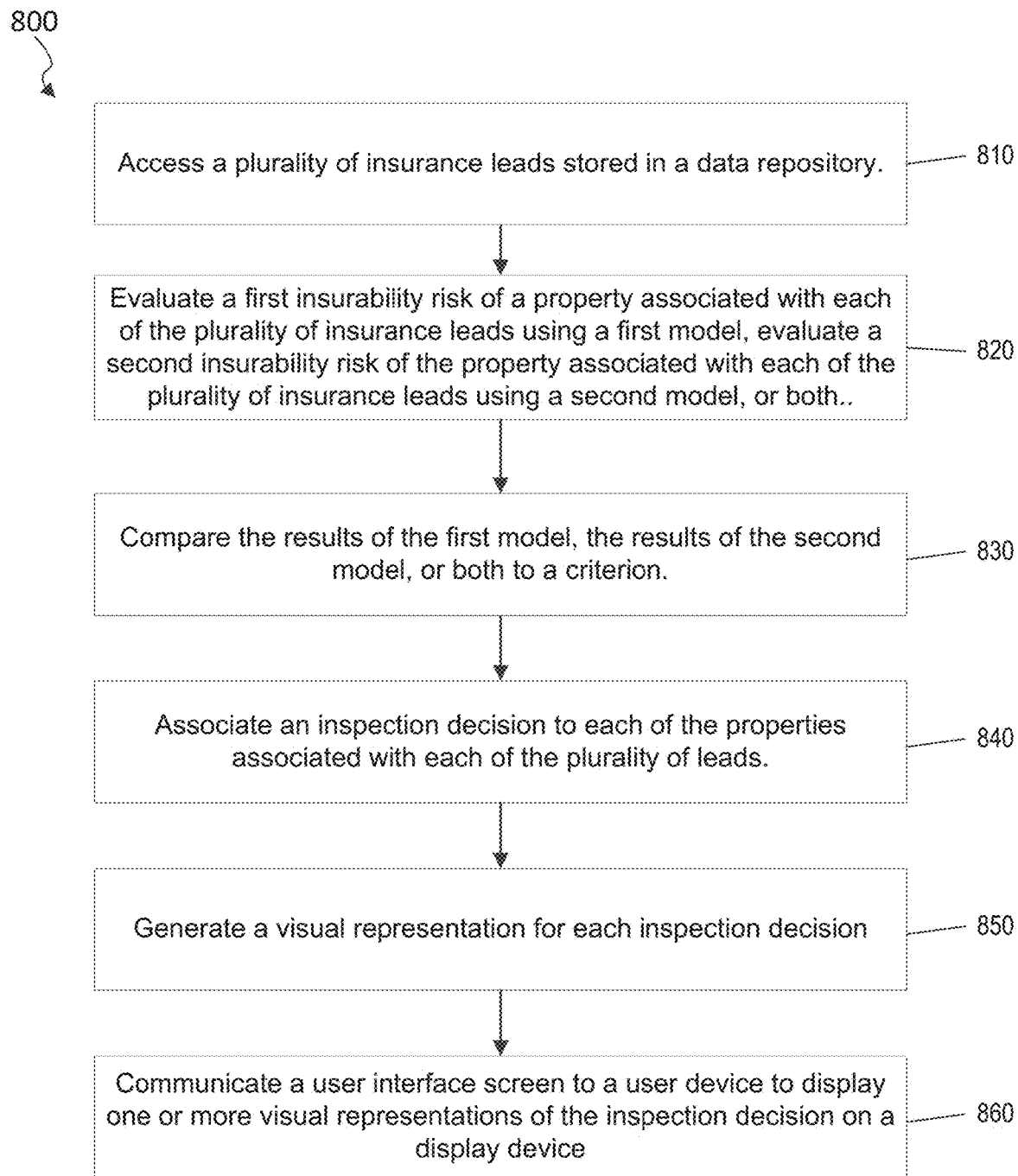
FIG. 8 shows an illustrative method for identifying one or more insurance leads for whom a property inspection can be waived, according to one or more aspects of the disclosure

FIG. 8 shows an illustrative method 800 for identifying one or more insurance leads (e.g., property insurance leads) for whom a property inspection can be waived, according to one or more aspects of the disclosure. At 810, a plurality of insurance leads may be accessed at one or more data repositories. For example, the insurance quotation system 207 may access a plurality of insurance leads at one or more insurance lead sources 750. For example, the insurance quotation system 207 may access a plurality of leads provided by a third party computing system 710, a data repository that may store unbound leads (e.g., the unbound lead repository 720), and/or a data repository storing information corresponding to a plurality of existing insurance policies (e.g., the policy data repository 730) via the network 205. In some cases, the plurality of insurance leads may be communicated to the insurance quotation system 207 for processing. In other cases, at least a portion of the insurance leads may be accessed remotely via the network 205. At 820, insurance quotation system 207 may analyze the plurality of insurance leads to determine whether or not a property inspection may be waived for a property insurance lead, such as during the insurance quotation process. For example, the property inspection decision device 230 may analyze each of the plurality of property insurance leads using one or more models such as to determine an insurability risk score. In some cases, the property inspection decision device 230 may evaluate a first insurability risk associated of each property associated with each of the plurality of property insurance leads using a first model and may evaluate a second insurability risk associated with each property associated with each of the plurality of property insurance leads using a second model. In some cases, the property inspection decision device may determine an insurability risk score associated with each property using both models, where the property inspection decision device may combine (e.g., average, etc.) the determined insurability risk scores.

At 830, the property inspection decision device 230 may evaluate the results received from the first model, the second model, or both the first model and the second model to a criterion. For example, the determined insurability risk scores may be compared with a threshold value, where values greater than the threshold value may be associated with an ability to waive a property inspection for a particular property and values less than the threshold may be associated with a requirement to inspect the property during a property inspection quotation process. At 840, the determined inspection decision (e.g., a required inspection, a waived inspection, an indeterminate result, etc.) may be associated with each of the plurality of property insurance leads based on the comparison performed in step 830 by the property inspection device 230, the lead aggregator 745, or the like. At 850, the lead aggregator 745 and/or the insurance application 776 running on a remote user device 770 may be used to generate a visual representation (e.g., one or more user interface screens 775) of the inspection decision associated with each of the plurality of leads. For example, the lead aggregator or the insurance application may process the plurality of property inspection leads to identify and plot a visual representation of each of the property inspection leads in a table, a list, or on a map for display to a user in a user interface screen 775 displayed on the user interface 773 of the user device 770. At 860, the generated user interface screens 775 may be communicated to a user interface device to display one or more visual representations of the inspection decision via the user interface 773 of the user device 770. For example, the lead aggregator 745 may communicate one or more user interface screens via the network 705 (e.g., the Internet) to the user device 770. The user device 770 may store the user interface screens 775, or information for generating the user interface screens 775 in the one or more memory devices 774 and then display the user interface screens based on information selected by a user via the user interface 773.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. A system comprising:
a data repository including information corresponding to a plurality of property insurance leads, property inspection data for previously inspected properties, and claims data for previously submitted claims;
a property inspection computing device comprising a processor;
a network communicatively coupling the data repository to the property inspection computing device; and
a non-transitory memory device storing instructions that, when executed by the processor cause the property inspection computing device to provide a computer-implemented self-learning adaptable inspection model, including:
analyzing, by an inspection model generator, at least a portion of the property inspection data and the claims data;
generating, by the inspection model generator, one or more adjustments to the computer-implemented self-learning adaptable inspection model based on the analysis of the at least a portion of the property inspection data and the claims data, the adaptable inspection model configured to identify one or more risks associated with providing insurance coverage for the property;
applying, by an adjustment module of the inspection model generator, the one or more adjustments to the adaptable inspection model;
for each of the property insurance leads:
determining, by one or more computing devices, an insurability risk score for a property associated with the each of the property insurance leads using the adaptable inspection model, wherein determining the insurability risk score includes:
calculate a first model risk score corresponding to an insurability risk associated with insuring the property, the first model risk score determined using a first inspection risk model;
calculate a second model risk score corresponding to an insurability risk associated with insuring the property, the second model risk score determined using a second inspection risk model; and
calculate the insurability risk score based on the first model risk score and the second model risk score; and
comparing the insurability risk score to a constraint;
determining one or more of the property insurance leads for which the insurability risk score meets the constraint;
determining whether each of the one or more of the property insurance leads is to be inspected by applying an inspection percentage target;
generating a user interface displaying a geographic map including a plurality of first visual indicators identifying a location of each of the property insurance leads, along with a second visual indicator for each of the property insurance leads indicating whether or not an inspection of each property associated with each of the plurality of property insurance leads is to be ordered, the second visual indicator having a first display color, size or pattern when inspection of a property is to be ordered, and having a second display color, size or pattern, different from the first display color, size or pattern, when inspection of a property is not to be ordered;
updating at least the property inspection data based on the indication of whether an inspection of each property is to be ordered; and
self-revise the adaptable inspection model by:
further analyzing one or more portions of the updated property inspection data and the claims data to determine an adjustment to a weighting factor of the adaptable inspection model; and
further adjusting the adaptable inspection model based on the further analysis by applying the weighting factor adjustment.

2. The system of claim 1,
wherein the non-transitory memory device further comprises instructions that, when executed by the processor, cause the processor to:
calculate the insurability risk score using a first weighting factor applied to the first model risk score and a second weighting factor applied to the second model risk score, the first and second weighting factors configured to minimize costs associated with providing property insurance for a plurality of properties.

3. The system of claim 1, wherein the non-transitory memory device further comprises instructions that, when executed by the processor, cause the processor:
calculate the insurability risk score using a first weighting factor to weight the first model risk score and a second weighting factor to weight the second model risk score, the weighting factors configured to identify a maximum number of potential property issues associated with providing property insurance for a plurality of properties.

4. The system of claim 1, wherein the non-transitory memory device further comprises instructions that, when executed by the processor, cause the processor to:
apply a first weighting factor to the first model risk score and a second weighting factor to the second model risk score, the first and second weighting factors configured to minimize costs associated with providing property insurance for a plurality of properties and to identify a maximum number of property issues associated with providing property insurance for the plurality of properties.

5. The system of claim 1, the instructions to determine the insurability risk score further comprise instructions that, when executed by the processor, cause the processor to:
calculate a first condition hazard metric and a first insurance-to-value metric using the first inspection risk model;
calculate a second condition hazard metric and a second insurance-to-value metric using the second inspection risk model; and
calculate the insurability risk score as a combination of the first condition hazard metric, the second condition hazard metric, the first insurance-to-value metric, and the second insurance-to-value metric.

6. The system of claim 1, wherein the non-transitory memory device further comprises instructions that, when executed by the processor, cause the processor to:
generate a user interface screen indicating whether or not to inspect each property associated with each of the plurality of insurance leads.

7. The system of claim 1, further comprising,
a remote user device comprising a processor running an insurance application, wherein the insurance application:
accesses, via the network, information associated with the plurality of property insurance leads including an indication of whether or not an inspection of each property associated with each of the plurality of insurance leads is to be ordered;

analyzes information associated with each of the plurality of property insurance leads to determine a geographic area including a majority of properties not requiring an inspection; and generate a user interface screen for display on a user interface of the user device, wherein the user interface screen includes a visual representation of the geographic area including a majority of properties not requiring a property inspection.

8. The system of claim 7, wherein the insurance application is further configured to: generate a visual representation of a geographic area including a majority of properties that require a property inspection.

9. The system of claim 1, wherein applying the one or more adjustments includes adjusting at least one of the first insurance risk model and the second insurance risk model.

10. The system of claim 1, wherein the adaptable inspection model operates using a first set of parameters when a request for inspection originates from a first geographical region and a second set of parameters when the request for inspection originates from a second geographical region.

11. The system of claim 1, wherein the non-transitory memory device further comprises instructions that, when executed, cause the processor to:
communicate, via a network, to an originator of an inspection request, a real-time decision corresponding to whether a respective property is to be inspected.

12. A computer-implemented method for a computer-implemented property inspection model to self-learn, the method comprising:
analyzing, by an inspection model generator of a property inspection computing device, at least a portion of property inspection data and claims data;
generating, by the inspection model generator, one or more adjustments to a computer-implemented adaptable inspection model based on the analysis of the at least a portion of property inspection data and claims data, the adaptable inspection model configured to identify one or more risks associated with providing insurance coverage for a property;
applying, by an adjustment module of the inspection model generator, the one or more adjustments to the adaptable inspection model;
accessing via a network by the property inspection computing device, a plurality of insurance leads stored in a data repository, wherein each of the plurality of insurance leads is associated with a respective property of a plurality of properties;
determining, by the property inspection computing device, a first insurability risk score associated with each of the plurality of properties using a first model of the adaptable inspection model;
determining, by the property inspection computing device, a second insurability risk score associated with each of the plurality of properties using a second model of the adaptable inspection model;
determining, by the property inspection computing device, a first set of one or more of the plurality of properties that should be inspected based on a weighted combination of the first insurability risk score and the second insurability risk score;
determining, by the property inspection computing device, a second set of one or more of the plurality of properties based on an inspection percentage target, the first set being a proper subset of the first set, the one or more of the plurality of properties in the second set being properties for which inspection is to be ordered;
communicating, via a network to a user device, a user interface screen presenting a home inspection determination for each of the properties associated with the plurality of insurance leads, wherein the home inspection determination comprises one of a first visual indicator corresponding to a required inspection and a second visual indicator corresponding to a waived inspection, the first visual indicator having a first display color, shape or pattern than a second display color, shape or pattern of the second visual indicator;
updating at least the property inspection data based on the indication of whether an inspection of each property is to be ordered; and
self-revising the adaptable inspection model by:
further analyzing one or more portions of the updated property inspection data and the claims data to determine an adjustment to a weighting factor of the adaptable inspection model; and
further adjusting the adaptable inspection model based on the further analysis by applying the weighting factor adjustment.

13. The method of claim 12, wherein the first model comprises a static model designed using historical property inspection information and the second model comprises an adjustable model including one or more adjustable weighting factors.

14. A system comprising:
a data repository storing a plurality of unbound property insurance leads, wherein each of the unbound property insurance leads is associated with a property;
a user computing device having a graphical user interface;
a property inspection computing device communicatively coupled via a network to the data repository and the user computing device and comprising:
a processor; and
a non-transitory memory device, the memory device storing instructions that, when executed by the processor, cause the property inspection computing device to provide a self-learning adaptable inspection model, including:
receiving, via the user interface, a request to provide insurance coverage for a property;
determining, by a total inspection score generator, an insurability risk score corresponding with a risk of providing insurance coverage for the property using the self-learning adaptable inspection model, wherein the adaptable inspection model includes a first inspection risk model, a second inspection risk model, and a control model, wherein the insurability risk score is computed by,
calculating a first model risk score corresponding to an insurability risk associated with insuring the property, the first model risk score determined using the first inspection risk model;
calculating a second model risk score corresponding to an insurability risk associated with insuring the property, the second model risk score determined using the second inspection risk model; and
calculating the insurability risk score based on the first model risk score and the second model risk score;
determining, by the total inspection score generator, whether the property should be inspected based on the insurability risk score meeting a constraint;

upon determining that the property should be inspected, determining, by the total inspection score generator, whether to order an inspection of the property based on an inspection percentage target and a magnitude of the insurability risk score;

ordering, via a communication interface, an-the inspection of the property upon determining that the inspection is to be ordered;

reporting, via the user interface, whether or not the property is to be inspected using a visual indicator, the visual indicator having a first display color, size or pattern when inspection of a property is to be ordered, and having a second display color, size or pattern, different form the first display color, size or pattern, when inspection of a property is not to be ordered;

receiving inspection data for one or more properties; and adapting, by an inspection model generator, the adaptable inspection model based on the received inspection data.

15. The system of claim 14, wherein the non-transitory memory device stores further instructions that, when executed by the processor, cause the property inspection computing device to:

determine, by the property inspection computing device, a first condition hazard metric and a first insurance-to-value metric using the first inspection risk model;

determine, by the property inspection computing device, a second condition hazard metric and a second insurance-to-value metric using the second inspection risk model; and combine, by a total inspection score generator, the first condition hazard metric with the first insurance-to-value metric determined using the first inspection risk model and the second condition hazard metric with the second insurance-to-value metric determined using the second inspection risk model to determine the insurability risk score.

16. The system of claim 14, comprising:

an inspection data repository communicatively coupled to the property inspection computing device and including information corresponding to a plurality of property inspections; and an insurance claim data repository communicatively coupled to the property inspection computing device; and wherein the non-transitory memory device is configured to further store instructions that, when executed by the processor, cause the property inspection computing device to:

retrieve inspection information from the inspection data repository, the inspection data including information associated with one or more property inspection decisions and information associated with one or more performed property inspections;

retrieve claim information from the claim data repository, the claim information including information associated with one or more property insurance claims; and determine, by a model generator, a weighting to be applied to an output of the first inspection risk model, a weighting to be applied to the second inspection risk model, based, at least in part, on the inspection information and the claim information.

* * * * *

UNITED STATES PATENT AND TRADEMARK OFFICE
CERTIFICATE OF CORRECTION

PATENT NO. : 10,572,947 B1
APPLICATION NO. : 14/956580
DATED : February 25, 2020
INVENTOR(S) : Berends et al.

Page 1 of 1

It is certified that error appears in the above-identified patent and that said Letters Patent is hereby corrected as shown below:

In the Specification

Column 6, Detailed Description, Line 35:
Delete "XML," and insert --XML--

Column 20, Detailed Description, Line 1:
Delete "list" and insert --lead--

Column 20, Detailed Description, Line 64:
Delete "704," and insert --774,--

In the Claims

Column 25, Claim 1, Line 14:
Delete "sell-learning" and insert --self-learning--

Column 26, Claim 7, Line 62:
Delete "comprising," and insert --comprising:--

Column 27, Claim 8, Line 14:
After "to:", insert --¶--

Column 27, Claim 9, Line 17:
After "claim 1,", delete "¶"

Column 28, Claim 14, Line 54:
Delete "by," and insert --by:--

Column 29, Claim 14, Line 6:
Delete "an-the" and insert --the--

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*